US012785129B2

(12) United States Patent
Park et al.

(10) Patent No.: US 12,785,129 B2
(45) Date of Patent: Nov. 3, 2026

(54) STRUCTURAL BATTERY STRUCTURE FOR WEARABLE ROBOT AND METHOD FOR MANUFACTURING SAME, AND METHOD FOR MEASURING TORQUE FOR ROTATION MODULE OF WEARABLE ROBOT AND TORQUE MEASURING DEVICE THEREFOR

(71) Applicant: SASUNG Power Co., Ltd., Yeonseo-myeon (KR)

(72) Inventors: Mi Young Park, Hwaseong-si (KR); Hyung Gu Kim, Hwaseong-si (KR)

(73) Assignee: SASUNG Power Co., Ltd., Sejong (KR)

( * ) Notice: Subject to any disclaimer, the term of this patent is extended or adjusted under 35 U.S.C. 154(b) by 314 days.

(21) Appl. No.: 18/697,344

(22) PCT Filed: Oct. 29, 2021

(86) PCT No.: PCT/KR2021/015401
§ 371 (c)(1),
(2) Date: Mar. 29, 2024

(87) PCT Pub. No.: WO2023/074964
PCT Pub. Date: May 4, 2023

(65) Prior Publication Data

US 2025/0046850 A1 Feb. 6, 2025

(30) Foreign Application Priority Data

Oct. 28, 2021 (KR) ........................ 10-2021-0145998
Oct. 29, 2021 (KR) ........................ 10-2021-0146230

(51) Int. Cl.
*H01M 10/04* (2006.01)
*B25J 9/00* (2006.01)
(Continued)

(52) U.S. Cl.
CPC ........... *H01M 10/04* (2013.01); *B25J 9/0006* (2013.01); *B25J 13/085* (2013.01); *B25J 19/005* (2013.01)

(58) Field of Classification Search
CPC ............... H01M 10/04; H01M 50/121; H01M 10/0585; Y02P 70/50; B25J 9/00;
(Continued)

(56) References Cited

U.S. PATENT DOCUMENTS 11,342,579 B2 * 5/2022 Takahata ............. H01M 50/198
12,368,150 B2 * 7/2025 Park .................... H01M 50/409
(Continued)

FOREIGN PATENT DOCUMENTS

EP 2609643 B1 * 6/2014 .......... H01M 10/044
EP 3822607 A1 5/2021
(Continued)

OTHER PUBLICATIONS

International Search Report and Written Opinion of the International Searching Authority mailed Aug. 16, 2022 for International Application No. PCT/KR2021/015401.

*Primary Examiner* — Octavia Hollington
(74) *Attorney, Agent, or Firm* — Secant IP, P.L.L.C.

(57) ABSTRACT

A method for manufacturing a structural battery structure is provided. The method for manufacturing a structural battery structure may comprise the steps of: preparing a first fabric on which a positive electrode active material layer is formed; preparing a second fabric on which a negative electrode active material layer is formed; preparing a third fabric having a first surface and a second surface facing the first surface; manufacturing a preliminary structural battery structure by compressing the first fabric and the second fabric to the third fabric such that the positive electrode active material layer is bonded on the first surface and the
(Continued)

negative electrode active material layer is bonded to the second surface; and manufacturing a structural battery structure by injecting resin into the preliminary structural battery structure and curing same.

2 Claims, 20 Drawing Sheets

(51) Int. Cl.
*B25J 13/08* (2006.01)
*B25J 19/00* (2006.01)

(58) Field of Classification Search
CPC ...... B25J 9/0006; B25J 13/085; B25J 19/005; G01L 3/10; G01L 5/00; Y02E 60/10
See application file for complete search history.

(56) References Cited

U.S. PATENT DOCUMENTS

| | | | | |
|---|---|---|---|---|
| 2012/0308887 | A1 | 12/2012 | Hucker et al. | |
| 2020/0203677 | A1* | 6/2020 | Lee | H01M 10/0418 |

FOREIGN PATENT DOCUMENTS

| | | | | | |
|---|---|---|---|---|---|
| JP | 2010251018 | A | * | 11/2010 | |
| JP | 5417989 | B2 | * | 2/2014 | |
| KR | 10-2008-0094930 | A | | 10/2008 | |
| KR | 10-1099521 | B1 | | 12/2011 | |
| KR | 10-2015-0100461 | A | | 9/2015 | |
| KR | 10-2016-0140490 | A | | 12/2016 | |
| KR | 10-1841142 | B1 | | 3/2018 | |
| KR | 10-2020-0019375 | A | | 2/2020 | |
| KR | 10-2020-0125955 | A | | 11/2020 | |
| KR | 10-2021-0060997 | A | | 5/2021 | |
| KR | 20210060997 | A | * | 5/2021 | H01M 50/44 |

* cited by examiner

STRUCTURAL BATTERY STRUCTURE FOR WEARABLE ROBOT AND METHOD FOR MANUFACTURING SAME, AND METHOD FOR MEASURING TORQUE FOR ROTATION MODULE OF WEARABLE ROBOT AND TORQUE MEASURING DEVICE THEREFOR

CROSS REFERENCE TO RELATED APPLICATIONS

This application is the National Stage of International Application PCT/KR2021/015401 (filed 29 Oct. 2021), which claims the benefit of Republic of Korea Patent Application 10-2021-0146230 (filed 29 Oct. 2021) and Republic of Korea Patent Application 10-2021-0145998 (filed 28 Oct. 2021). All of these priority applications are hereby incorporated by reference herein.

TECHNICAL FIELD

The present application relates to a structural battery structure and a method for manufacturing the same, and more specifically, to a structural battery structure for a wearable robot and a method for manufacturing the same.

In addition, the present invention relates to a torque measuring method and a torque measuring device therefor, and more specifically, to a torque measuring method for a rotation module of a wearable robot and a torque measuring device therefor.

BACKGROUND ART

Starting with “Hardiman”, which is the first wearable robot developed in the United States in 1965, a walking-assist robot began to be studied in earnest from the early 2000s, mainly at universities in Japan and the United States. From the mid-2000s to the early 2010s, there was a negative view of wearable robots, so there were not many developed products, but major companies conducted research on their own driver modules, electronic circuits, and manufacturing methods, and in the mid-2010s, wearable robot research began to enter its peak, and is being actively developed mainly in Korea, the United States, and Japan.

For example, Korean Registered Patent Publication No. 10-1099521 discloses a wearable robot walking suit comprising: a suit in the form of clothing having a plurality of electrode rods therein; a trunk fixing part formed to stably support a user’s waist, abdomen and back without deforming a user’s body by covering the user’s abdomen and back; a control part located on an upper part of the trunk fixing part surrounding the user’s back, receiving a biometric signal transmitted from the suit, and including a balance control sensor for maintaining a balance of the user’s body; a thigh fixing part having a hip joint driving motor for performing a crossed walk by determining the bending force of the user’s thigh based on the biometric signal transmitted from the control part while firmly supporting one side of the trunk fixing part by covering one side of the trunk fixing part and solidly supporting the same; a lower leg fixing part having a driving motor for a knee joint that is partially connected to the femoral fixing part to adjust a bending angle of the knee joint and an ankle and supports a user’s calf part; a muscle detection sensor for determining a walking state of the user by covering the user’s feet and being mounted on any one of a shoe part connected to the lower leg fixing part and the user’s both arms, the muscle detection sensor being capable of transmitting a measured muscular conduction signal to the control part while measuring the movement of the muscles; and a mode conversion part mounted on the other of the user’s arms and configured to transmit a signal to the control unit so that standing up, sitting down, walking forms, and walking conditions may be manipulated.

DISCLOSURE

Technical Problem

One technical problem to be solved by the present application is to provide a structural battery structure optimized for a wearable robot and a method for manufacturing the same.

Another technical problem to be solved by the present application is to provide a structural battery structure for a wearable robot capable of stably supporting a large load and a method for manufacturing the same.

Still another technical problem to be solved by the present application is to provide a structural battery structure for a wearable robot having high mechanical stability and a method for manufacturing the same.

Still another technical problem to be solved by the present application is to provide a high-capacity structural battery structure optimized for a wearable robot and a method for manufacturing the same.

Still another technical problem to be solved by the present application is to provide a torque measuring method and a torque measuring device for components of a wearable robot.

Still another technical problem to be solved by the present application is to provide a torque measuring method and a torque measuring device with improved ease of use.

Still another technical problem to be solved by the present application is to provide a torque measuring method and a torque measuring device which can easily measure an output torque value for components of a wearable robot having various shapes.

The technical problems to be solved by the present application are not limited to those described above.

Technical Solution

In order to solve the technical problems, the present application provides a method for manufacturing a structural battery structure.

According to one embodiment, the method for manufacturing a structural battery structure may include: preparing a first fabric on which a positive electrode active material layer is formed; preparing a second fabric on which a negative electrode active material layer is formed; preparing a third fabric having a first surface and a second surface facing the first surface; manufacturing a preliminary structural battery structure by compressing the first fabric and the second fabric to the third fabric such that the positive electrode active material layer is bonded to the first surface and the negative electrode active material layer is bonded to the second surface; and manufacturing the structural battery structure by injecting a resin into the preliminary structural battery structure and curing the resin.

According to one embodiment, the positive electrode active material layer may be selectively formed only on a central region of the first fabric, the negative electrode active material layer may be selectively formed only on a central region of the second fabric, a first cured polymer pattern and a second cured polymer pattern may be provided only on edges of the first surface and the second surface of the third fabric, respectively, the positive electrode active material layer formed on the central region of the first fabric may be bonded with the central region of the first surface of the third fabric surrounded by the first cured polymer pattern, and the negative electrode active material layer formed on the central region of the second fabric may be bonded with the central region of the second surface of the third fabric surrounded by the second cured polymer pattern.

According to one embodiment, the first fabric, the second fabric, and the third fabric may include a fabric woven by using glass fibers.

In order to solve the technical problems, the present application provides a method for manufacturing a structural battery structure.

According to one embodiment, the structural battery structure may include: a first fabric having a positive electrode active material layer; a second fabric spaced apart from the first fabric and having a negative electrode active material layer; a third fabric disposed between the first fabric and the second fabric; a first prepreg spaced apart from the third fabric with the first fabric interposed therebetween; and a second prepreg spaced apart from the third fabric with the second fabric interposed therebetween, in which a first cured polymer pattern, which completely surrounds a periphery of the positive electrode active material layer of the first fabric, is provided between the first fabric and the third fabric, and a second cured polymer pattern, which completely surrounds a periphery of the negative electrode active material layer of the second fabric, is provided between the second fabric and the third fabric.

According to one embodiment, the structural battery structure may further include a resin impregnated in the first to third fabrics.

In order to solve the technical problems, the present application provides a torque measuring device.

According to one embodiment, the torque measuring device may include: a pair of fixing jigs configured to fix a rotation module that is a component of a wearable robot, disposed while being spaced apart from each other, and extending in parallel to each other in one direction; a coupling jig configured to rotate while being coupled to a rotation part of the rotation module; and a torque sensor configured to measure an output torque of the coupling jig being rotated, in which the rotation module may be fixedly disposed between the pair of fixing jigs.

According to one embodiment, the torque measuring device may further include a lower plate disposed under the fixing jig to support the fixing jig, and coupled to the fixing jig by a coupling part.

According to one embodiment, the rotation module may be fixedly coupled to the lower plate through the fixing jig.

In order to solve the technical problems, the present application provides a torque measuring method.

According to one embodiment, the torque measuring method may include: fixing a rotation module, which is a component of a wearable robot, to a torque measuring device; rotating a rotation part of the rotation module by maximizing an output value of a motor included in the rotation module; and measuring an output torque of the rotation module by a torque sensor of the torque measuring device, in which the rotating of the rotation part of the rotation module by maximizing the output value of the motor included in the rotation module and the measuring of the output torque of the rotation module by the torque sensor may be defined as one unit process, a plurality of unit processes are performed, and an average value of output torque values, which are measured in the plurality of unit processes, may be defined as a maximum torque measurement result value of the rotation module.

According to one embodiment, the torque measuring device may include a pair of fixing jigs configured to fix the rotation module that is a component of a wearable robot, disposed while being spaced apart from each other, and extending in parallel to each other in one direction, and the fixing of the rotation module to the torque measuring device may include arranging the rotation module between the pair of fixing jigs.

Advantageous Effects

According to the method for manufacturing a structural battery structure according to the embodiment of the present invention, the structural battery structure may be manufactured by preparing a first fabric on which a positive electrode active material layer is formed, preparing a second fabric on which a negative electrode active material layer is formed, preparing a third fabric having a first surface and a second surface facing the first surface, manufacturing a preliminary structural battery structure by compressing the first fabric and the second fabric to the third fabric such that the positive electrode active material layer is bonded to the first surface and the negative electrode active material layer is bonded to the second surface, and manufacturing a structural battery structure by injecting a resin into the preliminary structural battery structure and curing the resin.

Therefore, the structural battery structure may obtain high mechanical properties, and may stably support loads applied in various directions when used in the wearable robot.

In addition, the positions and areas in which the positive electrode active material layer and the negative electrode active material layer are formed on the first fabric and the second fabric may be easily controlled, so that it is possible to manufacture a structural battery structure having various shapes optimized for the wearable robot.

The torque measuring device according to the embodiment of the present invention may include: a pair of fixing jigs configured to fix a rotation module that is a component of a wearable robot, disposed while being spaced apart from each other, and extending in parallel to each other in one direction; a coupling jig configured to rotate while being coupled to a rotation part of the rotation module; and a torque sensor configured to measure an output torque of the coupling jig being 20 rotated, in which the rotation module may be fixedly disposed between the pair of fixing jigs.

Accordingly, the output torque value for the rotation module, which is a component of the wearable robot, may be easily measured, and the rotation module may be easily and stably fixed to the torque measuring device during measurement of the output torque value for the rotation module.

MODE FOR INVENTION

Figure 1:
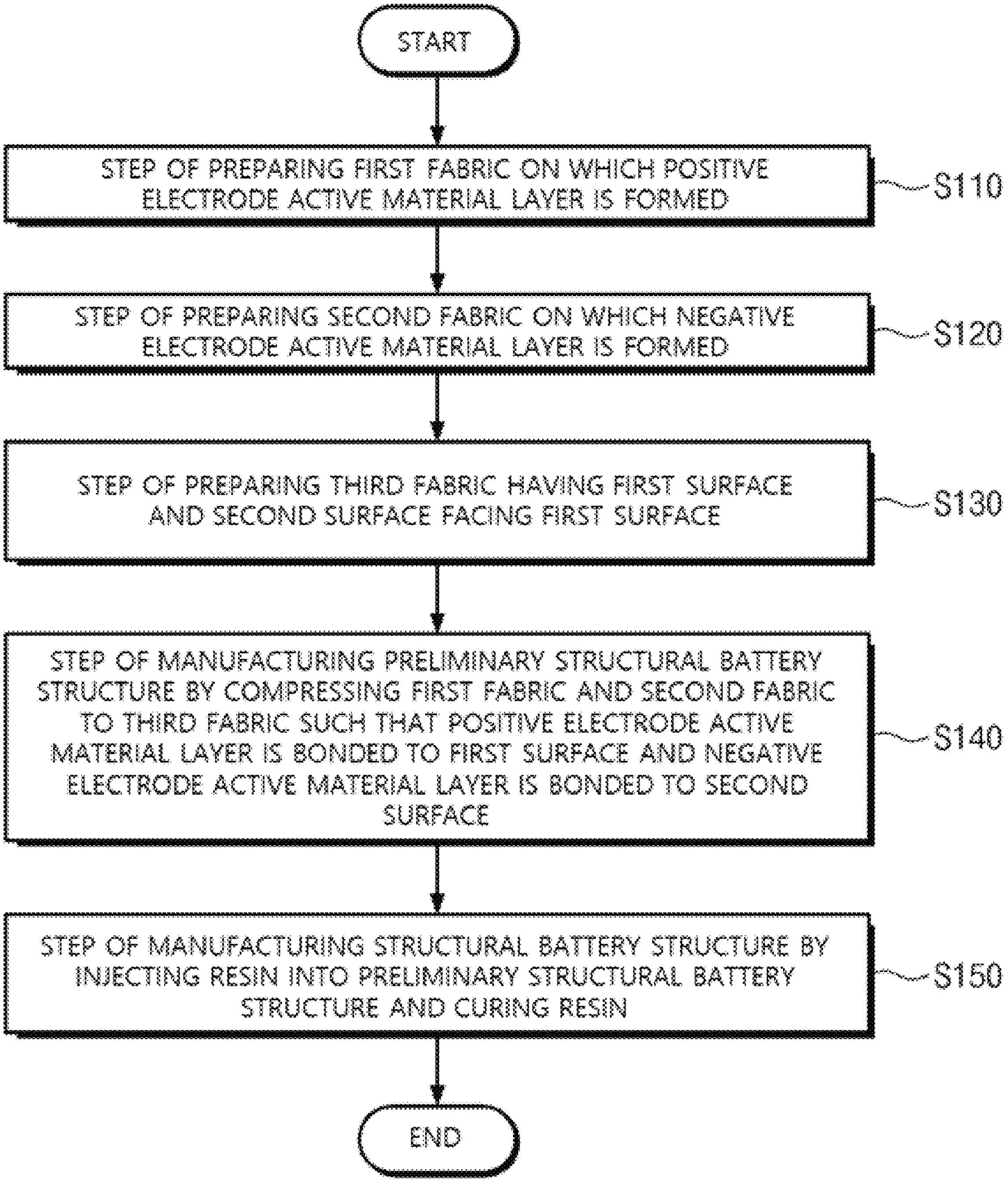
FIG. 1 is a flowchart for explaining a method for manufacturing a structural battery structure according to an embodiment of the present application.

Hereinafter, preferred embodiments of the present invention will be described in detail with reference to the accompanying drawings. However, the present invention may be embodied in different forms and should not be construed as limited to the embodiments set forth herein. Rather, the embodiments are provided so that this disclosure will be thorough and complete, and will fully convey the scope of the present invention to those skilled in the art.

In the present specification, it will be understood that when an element is referred to as being "on" another element, it can be formed directly on the other element or intervening elements may be present. In the drawings, the thicknesses of layers and regions are exaggerated for clarity.

In addition, it will be also understood that although the terms first, second, third, etc. may be used herein to describe various elements, these elements should not be limited by these terms. These terms are only used to distinguish one element from another element. Thus, a first element in some embodiments may be termed a second element in other embodiments without departing from the teachings of the present invention. Embodiments explained and illustrated herein include their complementary counterparts. As used herein, the term "and/or" includes any and all combinations of one or more of the associated listed elements.

The singular expression also includes the plural meaning as long as it does not differently mean in the context. In addition, the terms "comprise", "have" etc., of the description are used to indicate that there are features, numbers, steps, elements, or combination thereof, and they should not exclude the possibilities of combination or addition of one or more features, numbers, operations, elements, or a combination thereof. Furthermore, it will be understood that when an element is referred to as being "connected" or "coupled" to another element, it may be directly connected or coupled to the other element or intervening elements may be present.

In addition, when detailed descriptions of related known functions or constitutions are considered to unnecessarily cloud the gist of the present invention in describing the present invention below, the detailed descriptions will not be included.

A structural battery structure for a wearable robot according to an embodiment of the present application and a method for manufacturing the same will be described with reference to FIGS. 1 to 12.

Figure 2:
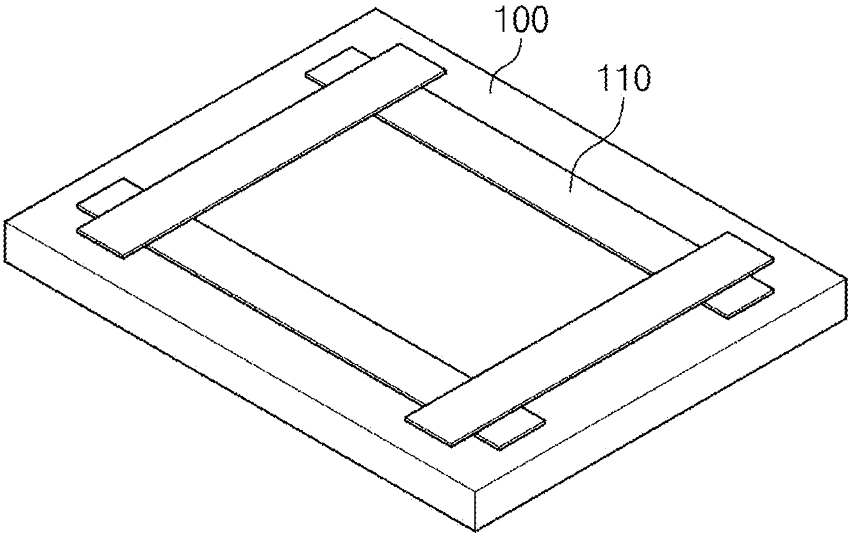
FIGS. 2 and 3 are views for explaining a manufacturing process of a first fabric having a positive electrode active material layer in the method for manufacturing a structural battery structure according to the embodiment of the present application.
Figure 3:
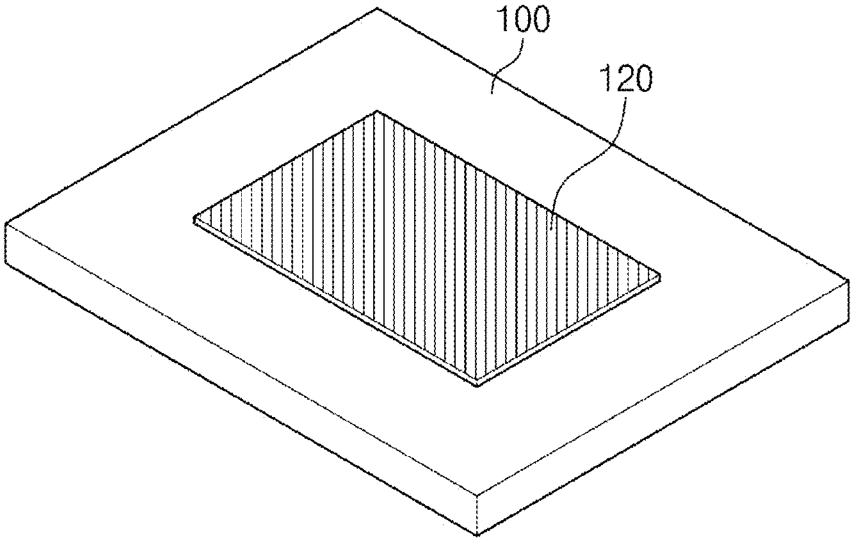
Figure 4:
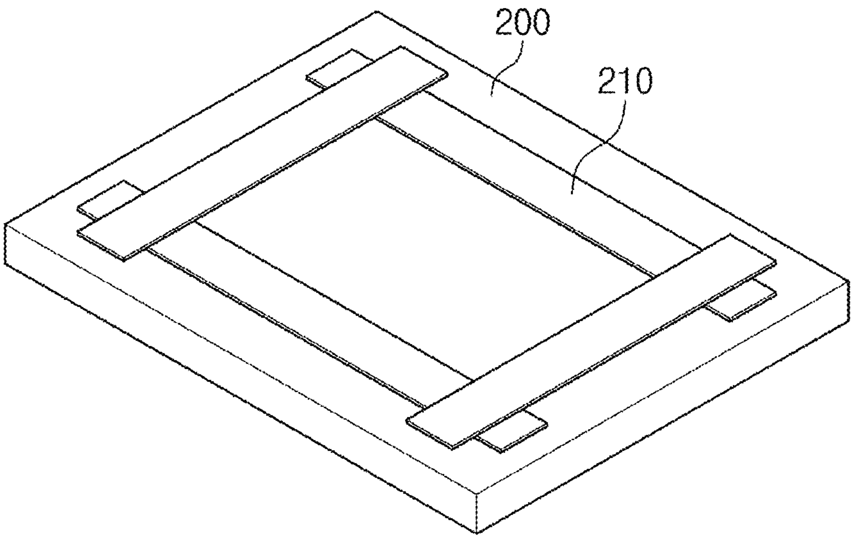
FIGS. 4 and 5 are views for explaining a manufacturing process of a second fabric having a negative electrode active material layer in the method for manufacturing a structural battery structure according to the embodiment of the present application.
Figure 5:
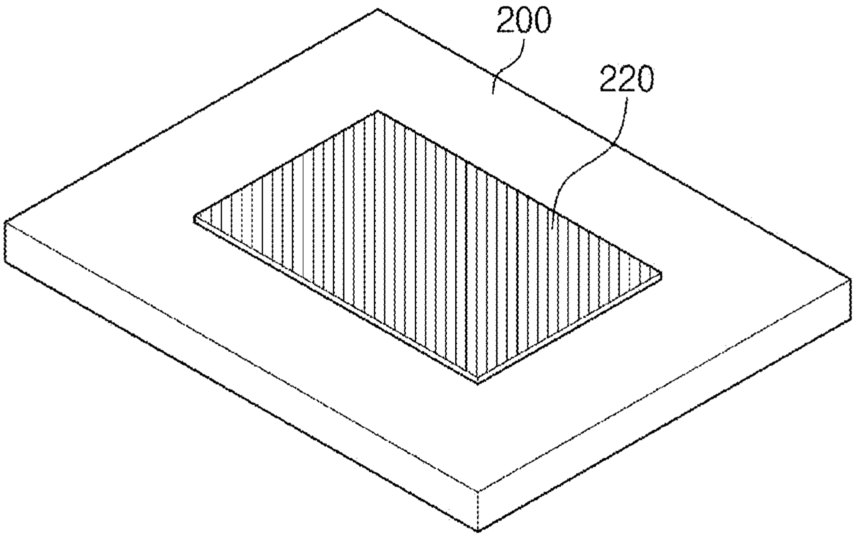
Figure 10:
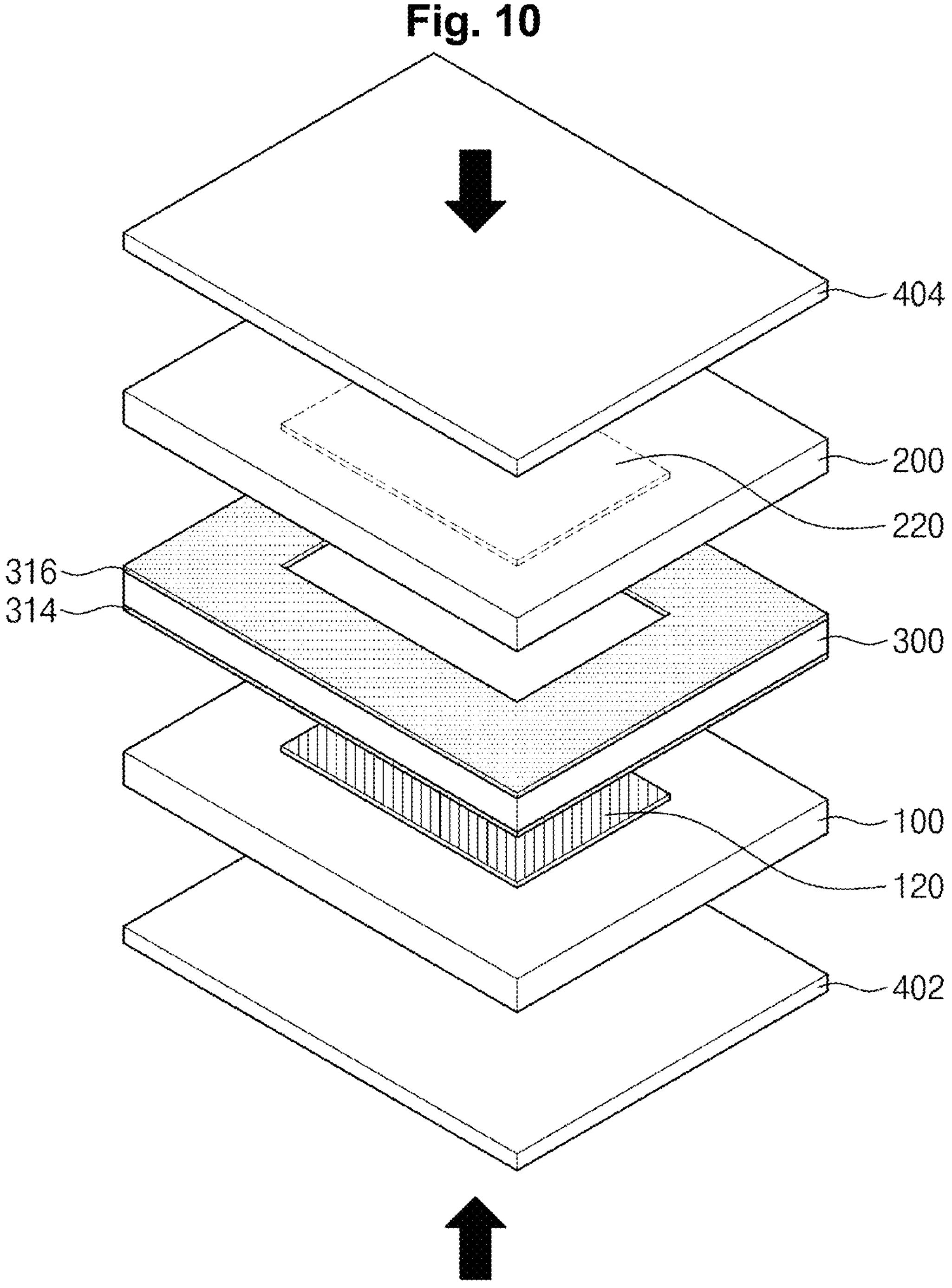
FIGS. 10 and 11 are views for explaining a vacuum pressing process of the first to third fabrics in the method for manufacturing a structural battery structure according to the embodiment of the present application.
Figure 11:
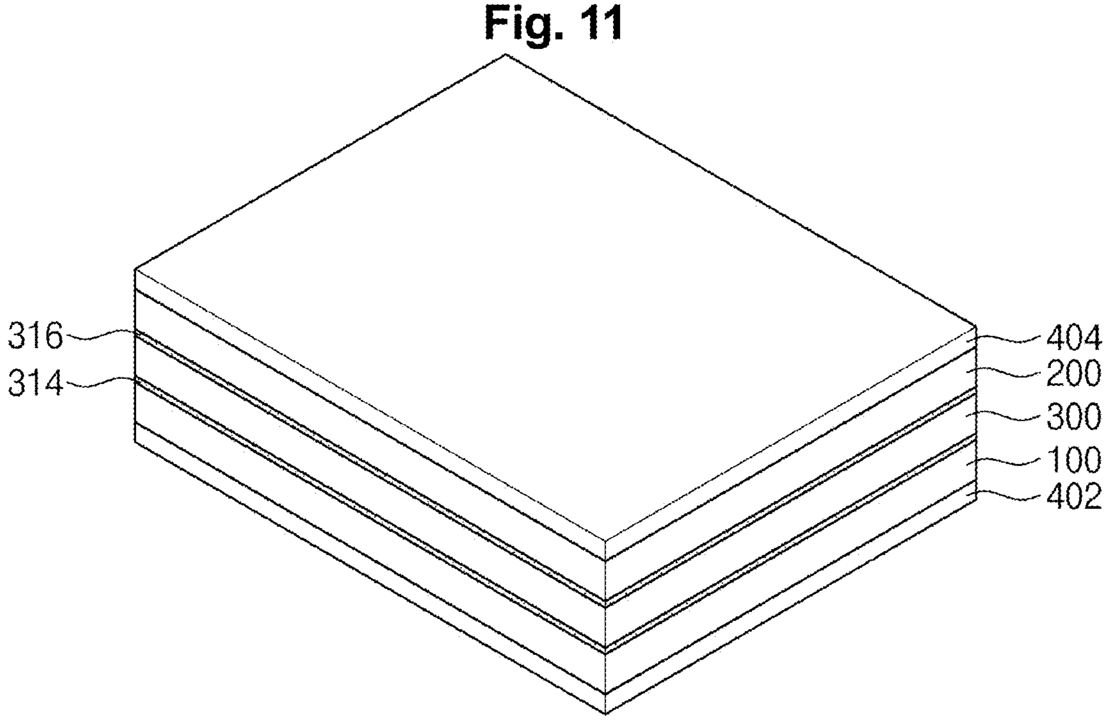
Figure 12:
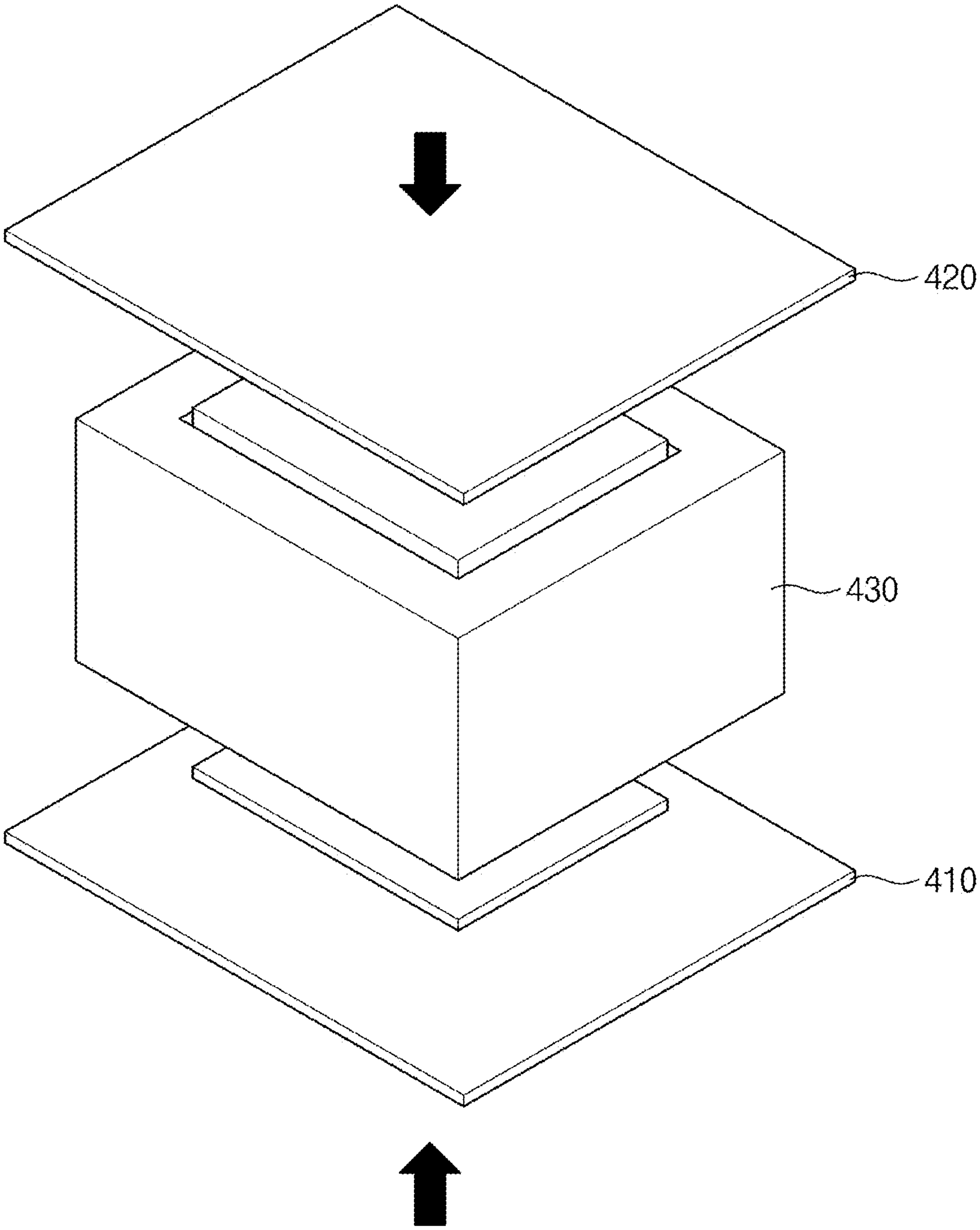
FIG. 12 is a view for explaining a mold used for manufacturing the structural battery structure according to the embodiment of the present application.

FIG. 1 is a flowchart for explaining a method for manufacturing a structural battery structure according to an embodiment of the present application, FIGS. 2 and 3 are views for explaining a manufacturing process of a first fabric having a positive electrode active material layer in the method for manufacturing a structural battery structure according to the embodiment of the present application, FIGS. 4 and 5 are views for explaining a manufacturing process of a second fabric having a negative electrode active material layer in the method for manufacturing a structural battery structure according to the embodiment of the present application, FIGS. 6 to 9 are views for explaining a manufacturing process of a third fabric having a cured polymer pattern in the method for manufacturing a structural battery structure according to the embodiment of the present application, FIGS. 10 and 11 are views for explaining a vacuum pressing process of the first to third fabrics in the method for manufacturing a structural battery structure according to the embodiment of the present application, and FIG. 12 is a view for explaining a mold used for manufacturing the structural battery structure according to the embodiment of the present application.

Referring to FIGS. 1 to 3, a first fabric 100 having a positive electrode active material layer 120 formed thereon is prepared (S110).

The step of preparing the first fabric 100 having the positive electrode active material layer 120 may include a step of adhering a masking tape 110 onto the first fabric 100, and a step of applying a positive electrode active material slurry onto the first fabric 100 and removing the masking tape 110.

As shown in FIG. 2, the masking tape 110 may be attached onto edges of the first fabric 100, and a central region of the first fabric 100 surrounded by the masking tape 110 may not be covered with the masking tape 110

After the masking tape 110 is attached, for example, a doctor blade may be used to apply the positive electrode active material slurry onto the first fabric 100, and after the positive electrode active material slurry is applied, the masking tape 110 may be removed, and drying and heat treatment may be performed in a vacuum oven to form a positive electrode active material layer 120.

In other words, the positive electrode active material layer 120 may be selectively formed only on the central region of the first fabric 100 surrounded by the masking tape 110, and the positive electrode active material slurry provided on the masking tape 110 may be removed together in the process of removing the masking tape 110. That is, an edge region except for the central region of the first fabric 100 may be provided while being exposed.

Accordingly, the positive electrode active material layer 120 may be formed on a local region of the first fabric 100.

The first fabric 100 may be, for example, a glass fiber fabric woven with glass fibers.

In addition, for example, the positive electrode active material layer 120 may be a transition metal oxide including lithium.

Next, referring to FIGS. 1, 4, and 5, a second fabric 200 having a negative electrode active material layer 220 formed thereon is prepared (S120).

The step of preparing the second fabric 200 having the negative electrode active material layer 220 may include a step of adhering a masking tape 210 onto the second fabric 200, and a step of applying a negative electrode active material slurry onto the second fabric 200 and removing the masking tape 210. In other words, the process of forming the negative electrode active material layer 220 on the second fabric 200 may be substantially the same as the process of forming the positive electrode active material layer 120 on the first fabric 100.

Accordingly, the negative electrode active material layer 220 may be formed on a local region (central region) of the second fabric 200.

Like the first fabric 100, the second fabric 200 may be, for example, a glass fiber fabric woven with glass fibers.

In addition, for example, the negative electrode active material layer 220 may include various materials such as lithium, silicon, and carbon.

Next, referring to FIGS. 1 and 6 to 9, a third fabric 300 having a first surface and a second surface facing the first surface is prepared (S130).

Figure 6:
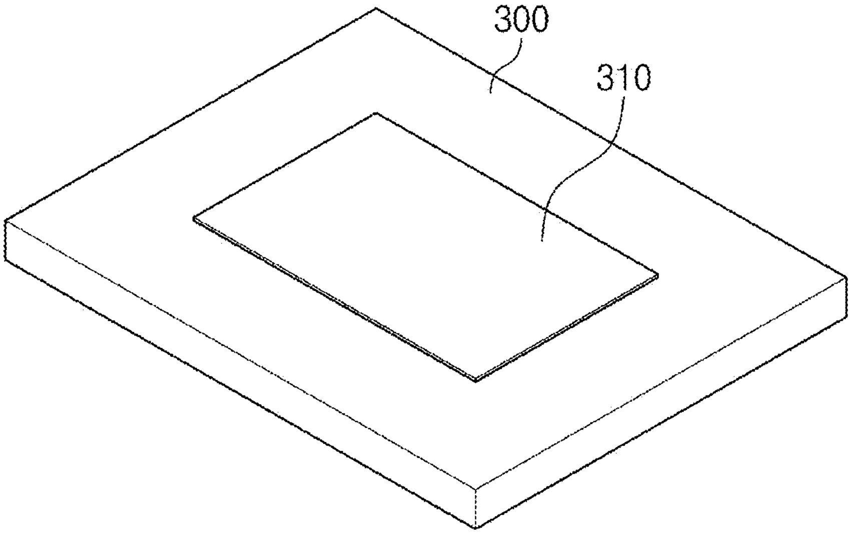
FIGS. 6 to 9 are views for explaining a manufacturing process of a third fabric having a cured polymer pattern in the method for manufacturing a structural battery structure according to the embodiment of the present application.
Figure 7:
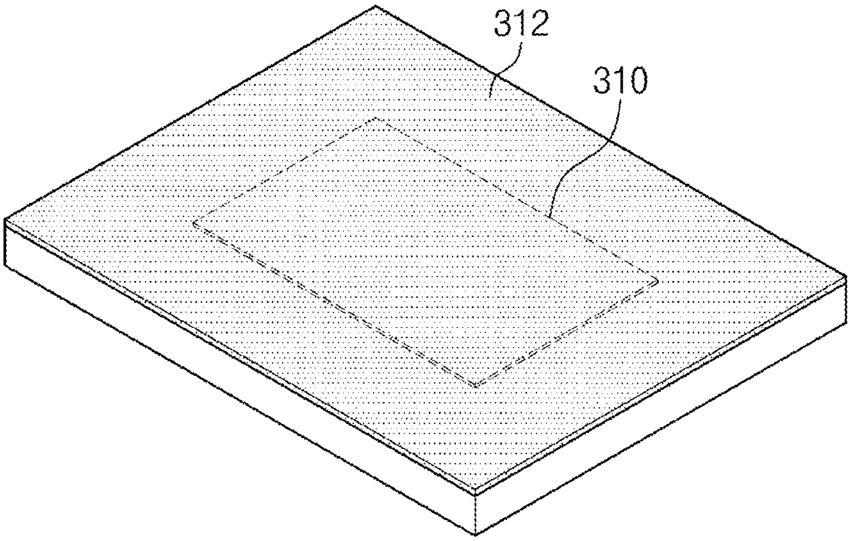

As shown in FIG. 6, a masking tape 310 may be attached onto the third fabric 300. Unlike the description with reference to FIGS. 2 to 4, the masking tape 310 may be attached onto the central region of the first surface of the third fabric 300, and an edge region of the first surface of the third fabric 300 may not be covered with the masking tape 310 and may be exposed.

After the masking tape 310 is attached onto the central region of the first surface of the third fabric 300, a photocurable polymer 312 may be applied onto the first surface of the third fabric 300. The photocurable polymer 312 may cover the entire first surface of the third fabric 300. That is, the photocurable polymer 312 may cover not only the masking tape 310 attached onto the central region of the first surface of the third fabric 300, but also the edge region of the third fabric 300 that is exposed without being covered by the masking tape 310.

After the photocurable polymer 312 is applied to the first surface of the third fabric 300, UV light is irradiated to cure the photocurable polymer 312. Thereafter, the masking tape 310 may be separated from the third fabric 300, and in this process, a portion of the cured photocurable polymer 312 disposed on the masking tape 310 may be selectively removed, and a portion of the cured photocurable polymer 312, which is not disposed on the making tape 310 and disposed on an edge of the first surface of the third fabric 300, may remain.

Figure 8:
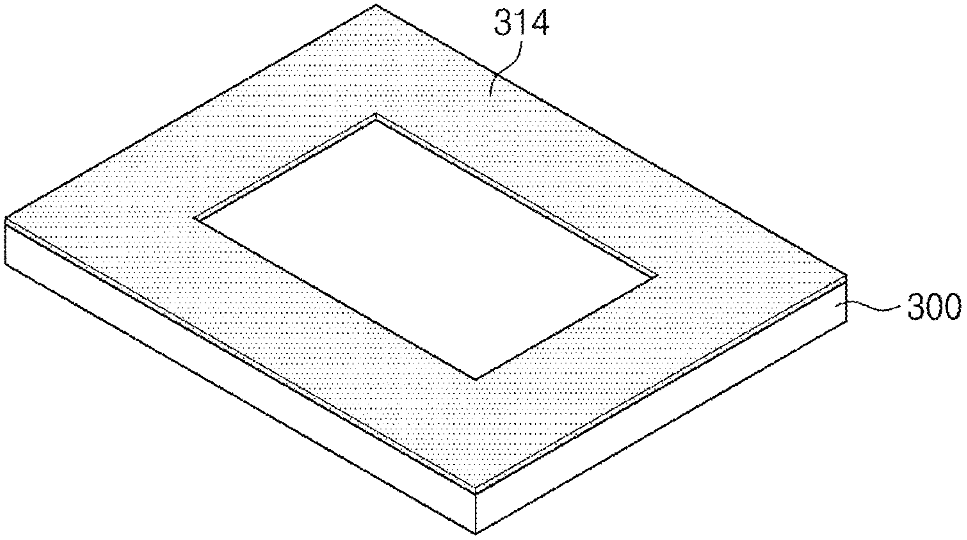
Figure 9:
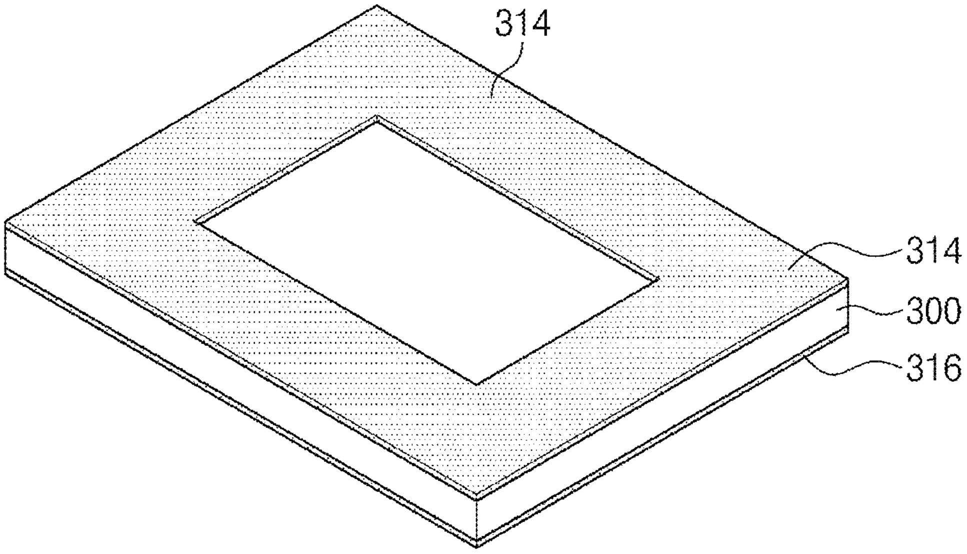

Accordingly, as shown in FIG. 8, the first surface of the third fabric 300 may be opened or exposed, and the remaining portion of the cured photocurable polymer 312 may be defined as a first cured polymer pattern 314.

The first cured polymer pattern 314 may be selectively provided only on the edge region of the first surface of the third fabric 300, and as described above, the central region of the first surface of the third fabric 300 may be exposed.

A second cured polymer pattern 316 may be formed on the second surface of the third fabric 300 on which the first cured polymer pattern 314 is formed. The second cured polymer pattern 316 may be formed in the same manner as the first cured polymer pattern 314.

Accordingly, the first polymer pattern 314 may be provided on the edge region of the first surface of the third fabric 300, and the second polymer pattern 316 may be provided on the edge region of the second surface of the third fabric 300.

Further, the central region of the first surface of the third fabric 300 surrounded by the first polymer pattern 314 may be opened or exposed, and the central region of the second surface of the third fabric 300 surrounded by the second polymer pattern 316 may also be opened or exposed.

The third fabric 300 may be, for example, a glass fiber fabric woven with glass fibers, like the first and second fabrics 100 and 200.

According to one modification example, in the process of curing the photocurable polymer 312, a shield filter for partially and entirely blocking the UV light may be disposed on the central region of the third fabric 300 on which the masking tape 310 is disposed. Accordingly, a portion of the photocurable polymer 312 disposed on the central region of the third fabric 300 may be non-cured or semi-cured. Therefore, in the process of removing the masking tape 310, a portion of the cured photocurable polymer 312 disposed on the masking tape 310 may be easily and selectively removed. In this case, before the masking tape 310 is removed, the photocurable polymer 312, which is non-cured or semi-cured, may be removed by a washing process.

Referring to FIGS. 1, 10, and 11, the first fabric 100 and the second fabric 200 may be compressed to the third fabric 300 such that the positive electrode active material layer 120 is bonded to the first surface and the negative electrode active material layer 220 is bonded to the second surface, thereby manufacturing a preliminary structural battery structure (S140).

Specifically, the first fabric 100 and the second fabric 200 may be compressed to the third fabric 300 such that the positive electrode active material layer 120 may be bonded to the central region of the first surface of the third fabric 300, the negative electrode active material layer 220 may be bonded to the central region of the second surface of the third fabric 300.

As shown in FIG. 10, according to one embodiment, a first prepreg 402 and a second prepreg 404 may be provided, the first to third fabrics 100, 200, and 300 may be disposed between the first prepreg 402 and second prepreg 404, and a pressure may be applied thereto so as to compress the first to third fabrics 100, 200, and 300. The first prepreg 402 and the second prepreg 404 may be a glass fiber fabric.

According to one embodiment, the area of the positive electrode active material layer 120 may be substantially the same as the area of the central region surrounded by the first cured polymer pattern 314 on the first surface of the third fabric 300, and the area of the negative electrode active material layer 220 may be substantially the same as the area of the central region surrounded by the second cured polymer pattern 316 on the second surface of the third fabric 300. In other words, the area and shape of the masking tape formed on the first surface of the third fabric 300 may be the same as the area and shape of the positive electrode active material layer 120, and the area and shape of the masking tape formed on the second surface of the third fabric 300 may be the same as the area and shape of the negative electrode active material layer 220.

In addition, according to one embodiment, the thickness of the positive electrode active material layer 120 may be substantially the same as the thickness of the first cured polymer pattern 314 on the first surface of the third fabric 300, and the thickness of the negative electrode active material layer 220 may be substantially the same as the thickness of the second cured polymer pattern 316 on the second surface of the third fabric 300.

Unlike the above description, according to another embodiment, the thickness of the first cured polymer pattern 314 may be larger than the thickness of the positive electrode active material layer 120, and the thickness of the second cured polymer pattern 316 may be larger than the thickness of the negative electrode active material layer 220. In the process of compressing the first fabric 100 and the second fabric 200 to the third fabric 300, as a pressure is applied in a thickness direction of the first cured polymer pattern 314 and the second cured polymer pattern 316, the thickness of the first cured polymer pattern 314 and the thickness of the second cured polymer pattern 316 are partially reduced, so that after the compression, the thickness of the first cured polymer pattern 314 may be substantially the same as the thickness of the positive electrode active material layer 120, and the thickness of the second cured polymer pattern 316 may be substantially the same as the thickness of the negative electrode active material layer 220. As described above, in the process of injecting a resin, which will be described later, a phenomenon in which the resin is provided between the positive electrode active material layer 120 and the third fabric 300 serving as a separation film may be minimized, and similarly, a phenomenon in which the resin is provided between the negative electrode active metal layer 220 and the third fabric 300 serving as a separation film may be minimized, by the first cured polymer pattern 314 and the second cured polymer pattern 316 having a relative large thickness. Therefore, the structural battery structure according to the embodiment of the present application may stably operate, and the manufacturing yield of the structural battery structure may be improved.

Referring again to FIG. 1, a resin may be injected into the preliminary structural battery structure and may be cured, thereby manufacturing a structural battery structure (S150).

The resin may be injected into the first to third fabrics 100, 200, and 300 compressed as described above and may be cured, and finally, structural the battery structure may be manufactured. The first and second prepregs 402 and 404 shown in FIGS. 10 and 11, and the resin injected into the first and second prepregs 402 and 404 and the first to third fabrics 100, 200, and 300 may be cured, so that mechanical properties of the structural battery structure may be improved, and the structural battery structure may stably support a high load.

As shown in FIG. 12, the process of injecting a resin may be performed by arranging the preliminary structural battery structure in the mold, compressing a bottom plate 410 and a top plate 420 of the mold such that a vacuum state is set, and injecting the resin into the bottom plate 410 and the top plate 420 to discharge the resin to the top plate 420 or the bottom plate 410.

The bottom plate 410 or the top plate 420 may be provided with an injection hole through which the resin may be injected, and the top plate 420 or the bottom plate 410 may be provided with a discharge hole through which the resin may be discharged.

Moreover, according to one embodiment, an intermediate structure 430 is provided between the bottom plate 410 and the top plate 420, and the preliminary structural battery structure may be disposed in an empty space inside the intermediate structure 430. The thickness of the structural battery structure, which is finally manufactured may be controlled according to the thickness of the intermediate structure 430. That is, the preliminary structural battery structure may be compressed so as to have the thickness of the intermediate structure 430, thereby manufacturing the structural battery structure having the thickness that is substantially the same as the thickness of the intermediate structure 430.

In FIG. 12, the thickness of the intermediate structure 430 is exaggerated to describe the effect according to the thickness of the intermediate structure 430, and the scope and the technical idea of the present application are not limited by the thickness shown in the drawings.

Further, according to one embodiment, after the preliminary structural battery structure is compressed using the mold, a vacuum state may be set and the resin may be injected. Accordingly, it is possible to minimize the resin injected between the positive electrode active material layer 120 and the third fabric 300 and between the negative electrode active material layer 220 and the third fabric 300.

For example, the resin may include a low viscosity epoxy and a curing agent, and a weight ratio thereof may be 100:45. In addition, for example, after the resin is injected, the resin is cured at normal temperature for 12 hours and post-cured at 60° C. for 4 hours.

A torque measuring method for a rotation module of a wearable robot according to the embodiment of the present application and a torque measuring device therefor will be described with reference to FIGS. 13 to 20.

Figure 13:
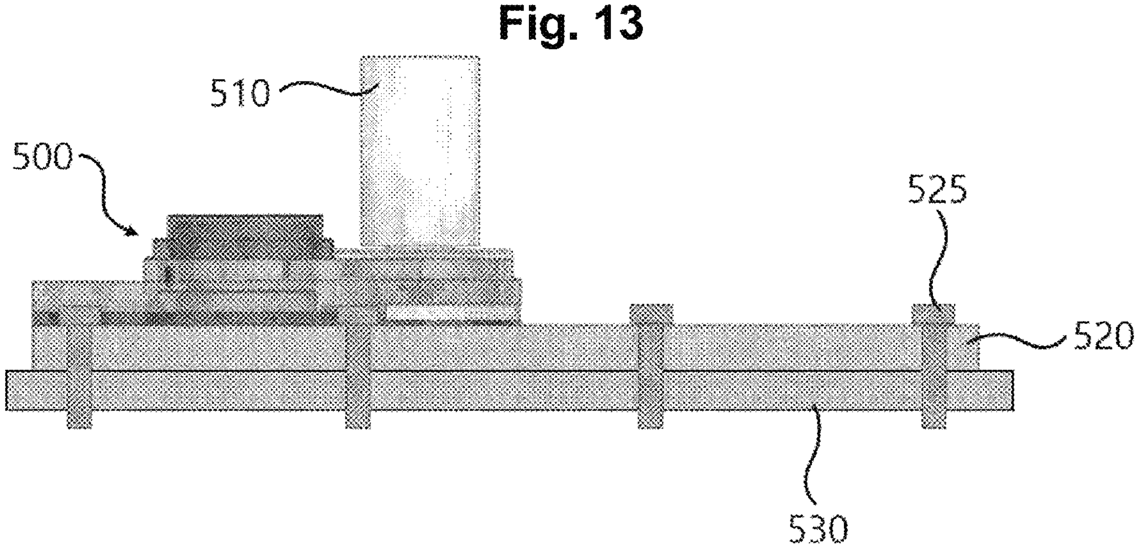
FIG. 13 is a side view for explaining a torque measuring device according to the embodiment of the present application.
Figure 14:
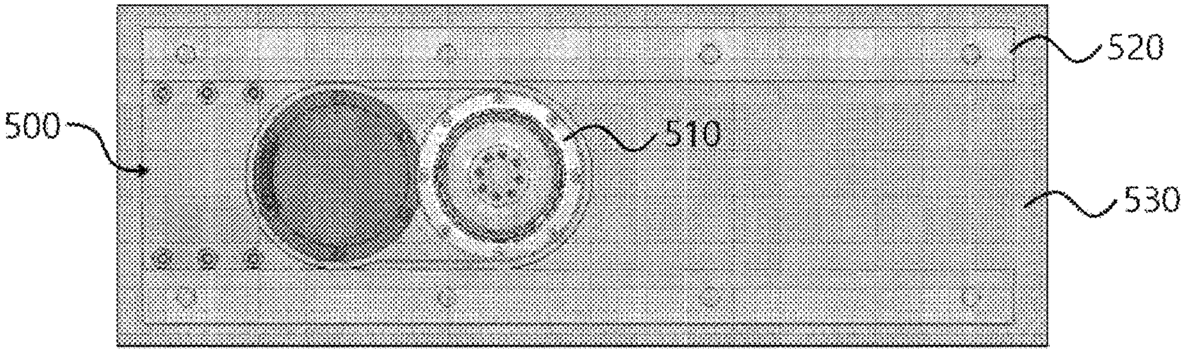
FIG. 14 is a top view for explaining the torque measuring device according to the embodiment of the present application.
Figure 15:
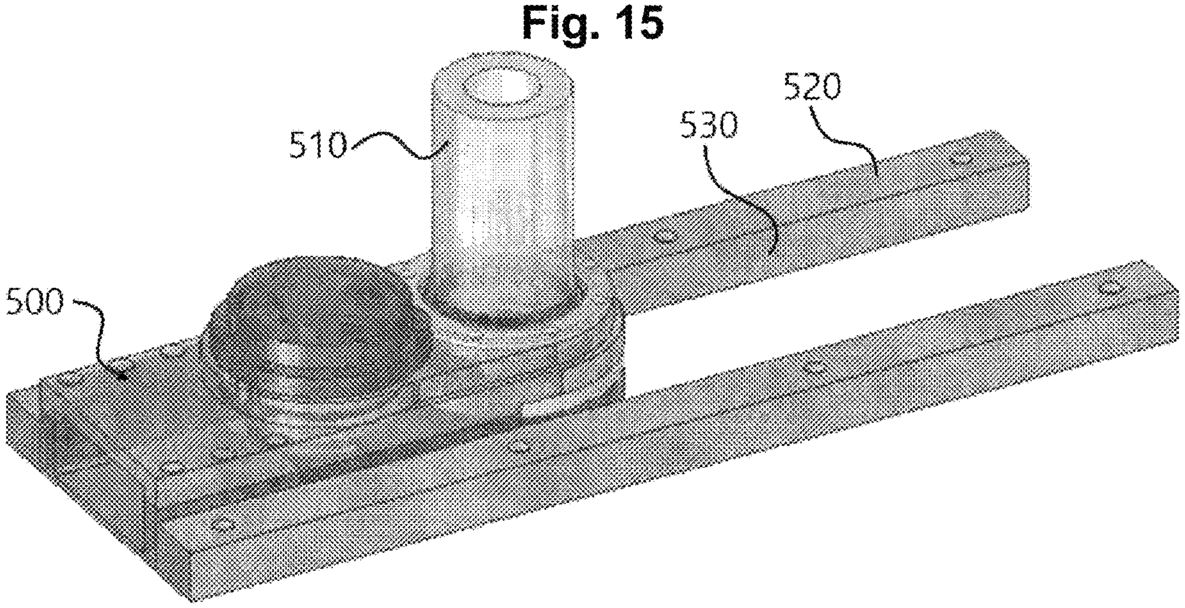
FIG. 15 is a perspective view for explaining the torque measuring device according to the embodiment of the present application.

FIG. 13 is a side view for explaining a torque measuring device according to the embodiment of the present application, FIG. 14 is a top view for explaining the torque measuring device according to the embodiment of the present application, and FIG. 15 is a perspective view for explaining the torque measuring device according to the embodiment of the present application.

Referring to FIGS. 13 to 15, the torque measuring device according to the embodiment of the present application may include a fixing jig 520, a coupling jig 510, a lower plate 530, and a torque sensor (not shown, described later).

A pair of fixing jigs 520 may be provided. The pair of fixing jigs 520 may be disposed while being spaced apart from each other, and may extend side by side in one direction. In addition, the pair of fixing jigs may be disposed on the lower plate 530 to be fixed to the lower plate 530 by coupling parts 525. Specifically, the fixing jigs 520 extending side by side in one direction may include a plurality of holes formed through the fixing jigs 520, and the coupling parts 525 (for example, bolts) may couple the fixing jigs 520 to the lower plate 530 through the plurality of holes. The coupling of the fixing jigs 520 and the lower plate 530 will be described later in more detail with reference to FIGS. 17 and 18.

A rotation module 500 may be disposed between the pair of fixing jigs 520 spaced apart from each other and extending side by side in the one direction. The rotation module 500 may include a rotation part that is rotated by a motor serving as a component of the wearable robot. The rotation module 500 may constitute, for example, joints of the wearable robot.

The coupling jig 510 may be fixedly coupled to the rotation part of the rotation module 500. The coupling jig 510 may have a cylindrical shape having an empty inner space, and the cylindrical coupling jig 510 is fastened using bolts or the like while being inserted into the rotation part of the rotation module 500. Accordingly, when the rotation part of the rotation module 500 is rotated by the motor, the coupling jig 510 may also be rotated according to the rotation of the rotation part. Specifically, as shown in FIGS. 13 to 15, when the fixing jigs 520 extend in a first direction and are spaced apart from each other in a second direction perpendicular to the first direction, the coupling jig 510 may be rotated in a third direction, which is perpendicular to the first direction and the second direction, serving as a rotation shaft. That is, accordingly, even if the coupling jig 510 is rotated, the rotation module 500 disposed between the pair of fixing jigs 520 may be stably fixed without being moved.

An upper end of the rotating coupling jig 510 may be connected to the torque sensor that measures an output torque of the coupling jig. Therefore, an output torque value of the coupling jig 510, that is, an output torque value of the motor for driving the rotation part may be easily measured.

The torque measuring method using the torque measuring device according to the embodiment of the present application may include a step of fixing the rotation module 500 to the torque measuring device, a step of rotating the rotation part of the rotation module 500 by maximizing an output value of the motor included in the rotation module 500, and a step of measuring an output torque of the rotation module by the torque sensor of the torque measuring device.

In this case, the step of rotating the rotation part of the rotation module 500 by maximizing the output value of the motor included in the rotation module 500 and the step of measuring the output torque of the rotation module 500 by the torque sensor may be defined as one unit process, in which the unit process may be performed a plurality of times.

As described above, when the unit process is performed a plurality of times, an average value of output torque values measured in the plurality of unit processes may be defined as a maximum torque measurement result value of the rotation module 500.

Figure 16:
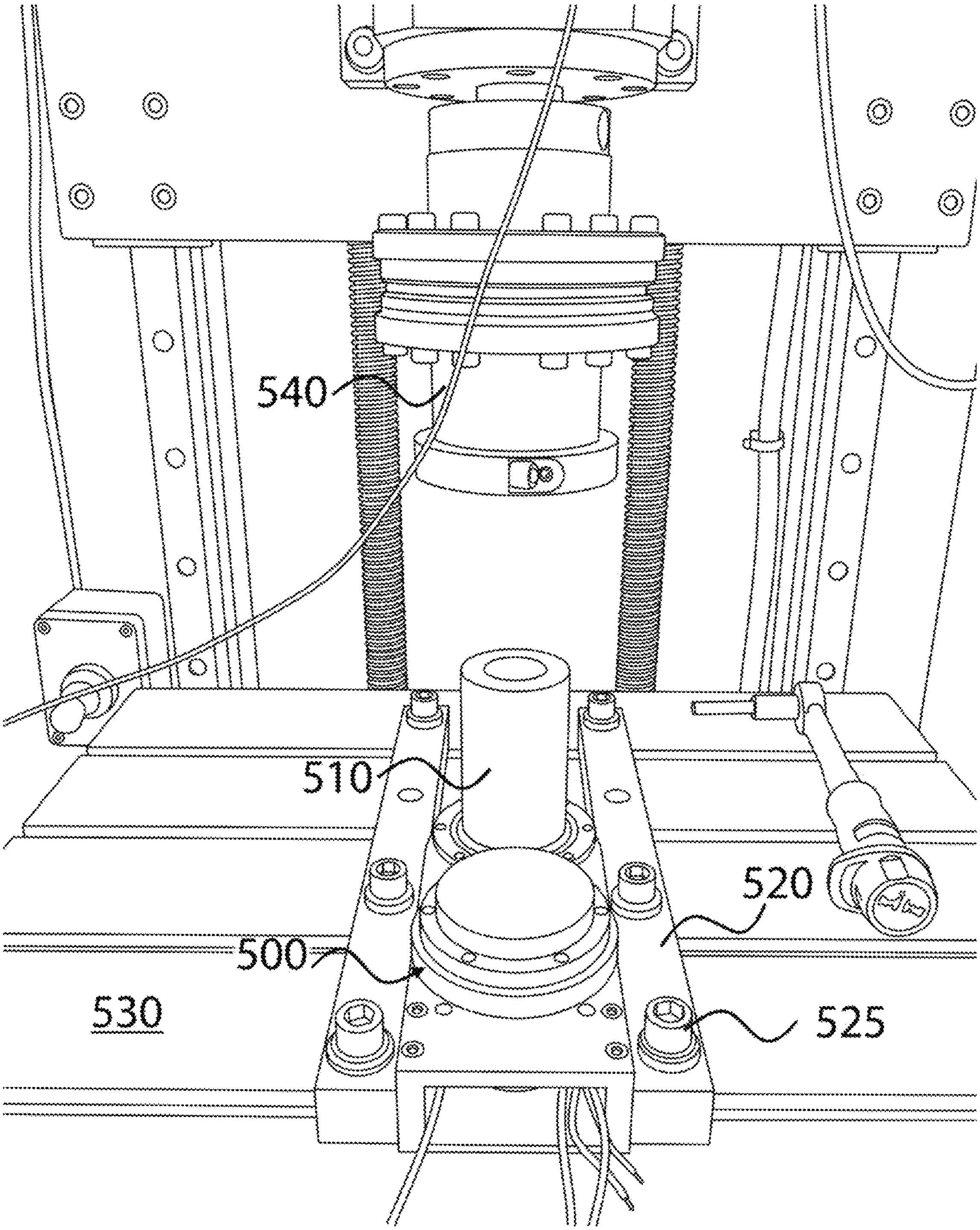
FIG. 16 is a photograph obtained by capturing an image of the torque measuring device according to the embodiment of the present application.

FIG. 16 is a photograph obtained by capturing an image of the torque measuring device according to the embodiment of the present application.

Referring to FIG. 16, as described with reference to FIGS. 13 to 15, the rotation module 500, the coupling jig 510, the fixing jig 520, the coupling portion 525, the lower plate 530, and the torque sensor 540 may be provided.

According to one modification example, the torque sensor 540 may be coupled to the coupling jig 510 to measure the output torque of the rotation module 500, in which the torque sensor 540 may apply a force in a direction in which the coupling jig 510 extends, that is, a direction toward the rotation module 500 or a direction away from the rotation module 500, and the torque sensor 540 may measure the output torque of the rotation module 500 in a state in which the force is applied. Accordingly, the output torque value of the rotation module 500 may be easily sensed under environmental conditions in which various forces are applied.

Figure 17:
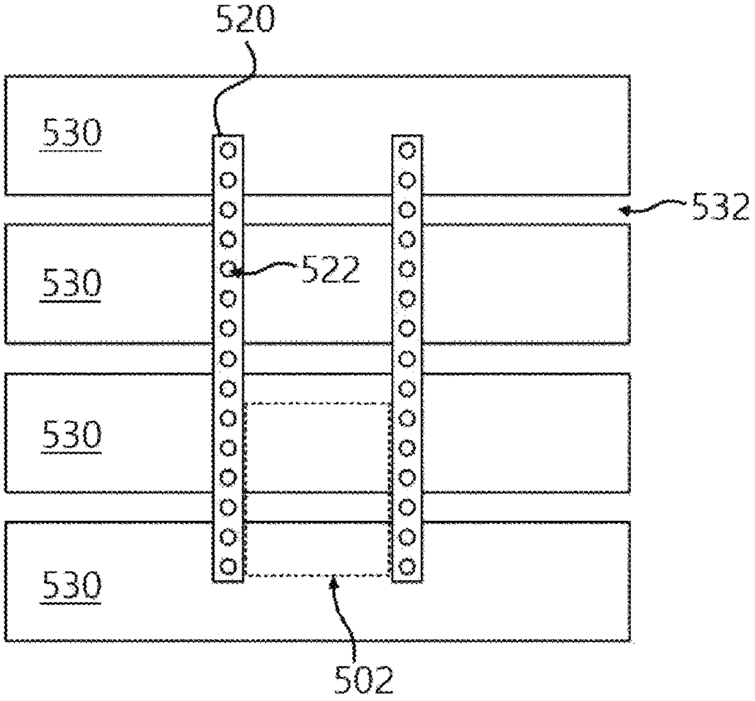
FIG. 17 is a view for explaining a coupling relationship between a fixing jig and a lower plate in the torque measuring device according to the embodiment of the present application.

FIG. 17 is a view for explaining a coupling relationship between a fixing jig and a lower plate in the torque measuring device according to the embodiment of the present application.

Referring to FIG. 17, a plurality of lower plates 530 may be provided, in which the plurality of lower plates 530 may be spaced apart from each other. Specifically, as shown in FIG. 17, when the fixing jig 520 is a rod type extending in the first direction, the lower plates 530 may be disposed while being spaced apart from each other in the first direction, and a plurality of grooves 532 may be provided between adjacent lower plates 530 spaced apart from each other in the first direction. The plurality of grooves 532 may extend in the second direction perpendicular to the first direction.

As described with reference to FIGS. 13 to 15, the fixing jig 520 may include a plurality of holes 222 formed through the fixing jig 520, and the plurality of holes 222 may be provided within the fixing jig 520 while being spaced apart from each other in the first direction.

Some holes 222 among the plurality of holes 222 arranged to be spaced apart from each other in the first direction within the fixing jig 520 may communicate with the grooves 532 extending in the second direction defined and generated between the lower plates 530.

A coupling part 235 described with reference to FIGS. 13 to 15 is provided in some holes 222 communicating with the grooves 532 so that the fixing jig 520 may be easily fixed to the lower plate 530. The coupling relationship between the fixing jig 520 and the lower plate 530 may also be seen in FIG. 16.

In addition, as described with reference to FIGS. 13 to 15, a measurement element arrangement space 102 in which the rotation module 500 may be fixedly disposed may be defined between the pair of fixing jigs 520.

Figure 18:
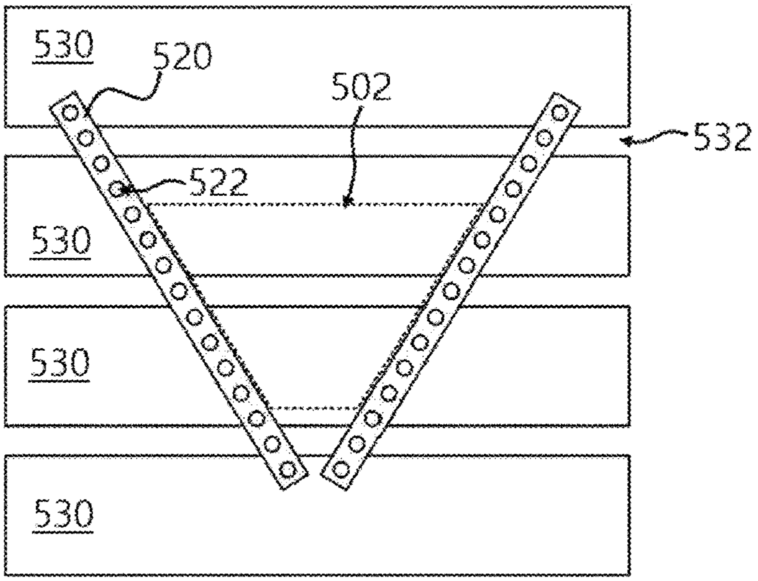
FIG. 18 is a view for explaining a modification example of the coupling relationship between the fixing jig and the lower plate in the torque measuring device according to the embodiment of the present application.

FIG. 18 is a view for explaining a modification example of the coupling relationship between the fixing jig and the lower plate in the torque measuring device according to the embodiment of the present application.

Referring to FIG. 18, the fixing jig 520 and the lower plate 530 may be provided as described with reference to FIG. 17. In addition, the grooves 532 may be provided between the adjacent lower plates 530, and the fixing jig 520 may include the plurality of holes 222.

Unlike the description with reference to FIG. 17, the pair of fixing jigs 520 may not be disposed side by side, that is, in parallel to each other. Specifically, as shown in FIG. 18, the pair of fixing jigs 520 may be disposed on the lower plate 530 such that virtual lines extending in a direction in which the pair of fixing jigs 520 extend intersect with each other.

Even in this case, some holes 222 among the plurality of holes 222 included in the pair of fixing jigs 520 may communicate with the grooves 532 extending in the second direction defined and generated between the lower plates 530, and the coupling parts 235 described with reference to FIGS. 13 to 15 may be provided in some holes 222 communicating with the grooves 532, so that the fixing jig 520 may be easily fixed to the lower plates 530.

Further, as described with reference to FIGS. 13 to 15, the measurement element arrangement space 102 in which the rotation module 500 may be fixedly disposed may be defined between the pair of fixing jigs 520, and the shape of the measurement element disposition space 102 may be different from that described with reference to FIG. 17 according to the arrangement of the pair of fixing jigs 520 disposed to intersect with each other without being disposed in parallel to each other.

That is, according to the embodiment of the present application, the pair of fixing jigs 222 may have various arrangement relationships in addition to being disposed in parallel to each other, and even if the pair of fixing jigs 222 have various arrangement relationships, some of the plurality of holes 222 may communicate with each other through the groove 532 provided between the plurality of lower plates 530 and the pair of fixing jigs 520. Accordingly, the pair of fixing jigs 520 may be easily fixed and coupled to the lower plate 530, and the shape of the measurement element arrangement space 102 may be variously and easily deformed according to various arrangement relationships of the pair of fixing jigs 520. Accordingly, the rotation modules of the wearable robot having various shapes may be fixed using the pair of fixing jigs 520 and the plurality of lower plates 530, and torque measurement for the rotation modules of the wearable robot having various shapes may be easily performed.

Figure 19:
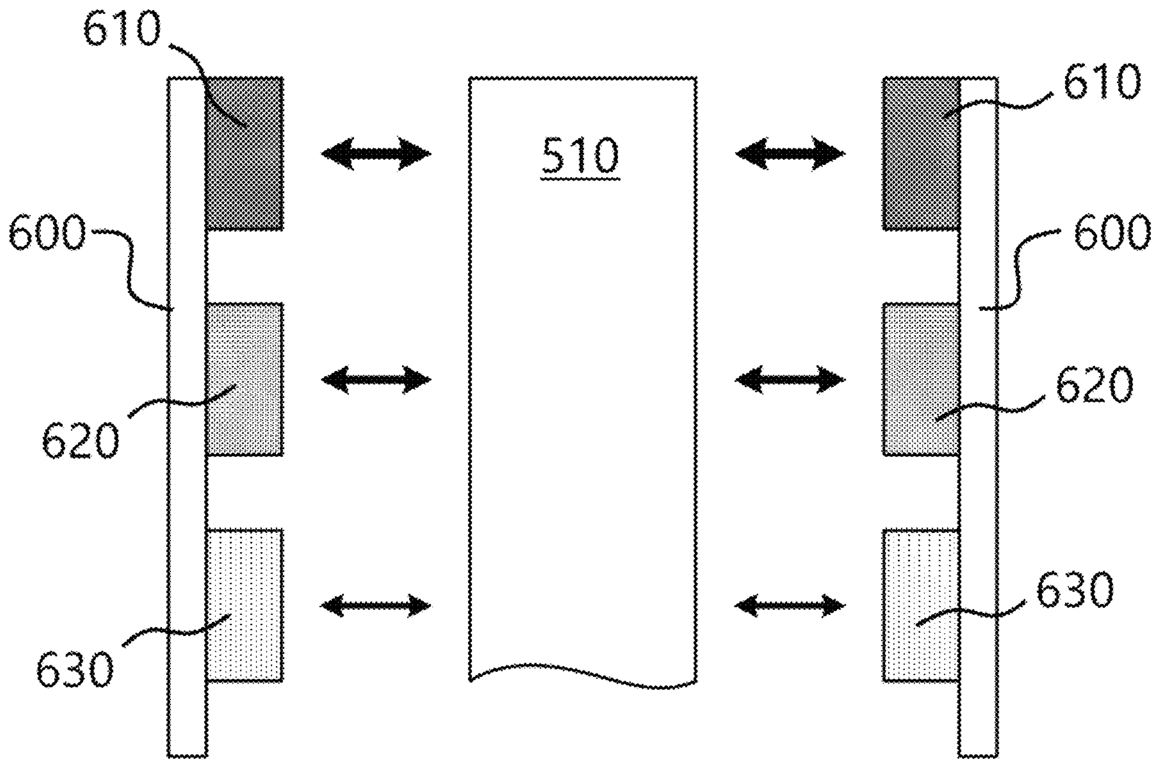
FIG. 19 is a side view for explaining a torque measuring process for eccentric rotation in the torque measuring device according to the embodiment of the present application.
Figure 20:
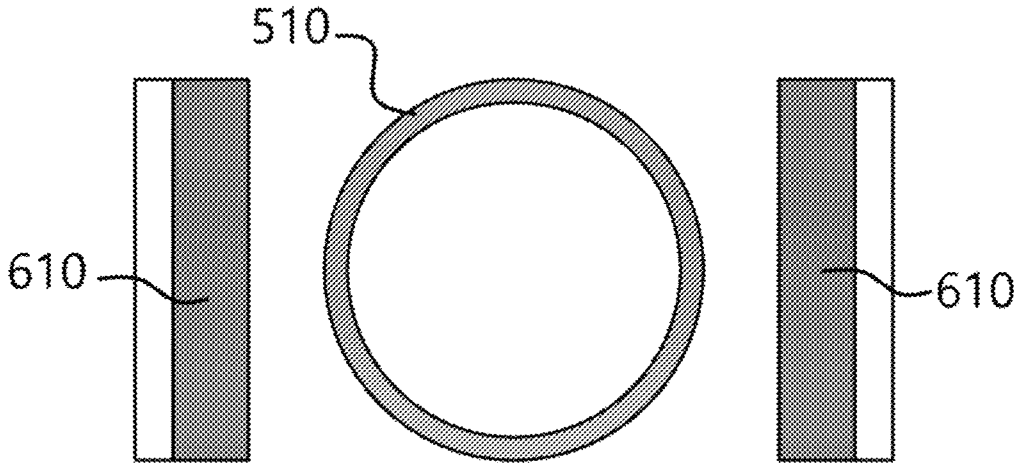
FIG. 20 is a top view for explaining the torque measuring process for eccentric rotation in the torque measuring device according to the embodiment of the present application.

FIG. 19 is a side view for explaining a torque measuring process for eccentric rotation in the torque measuring device according to the embodiment of the present application, and FIG. 20 is a top view for explaining the torque measuring process for eccentric rotation in the torque measuring device according to the embodiment of the present application.

Referring to FIGS. 19 and 20, the coupling jig 510 that is rotated while being coupled to the rotation part of the rotation module 500 described with reference to FIGS. 13 to 15 is provided. A support substrate 300 and a plurality of magnet structures 310, 320, and 330 disposed on the support substrate 300 are provided on at least one of one side and the other side of the coupling jig 510. That is, although FIGS. 19 and 20 show that the plurality of magnet structures 310, 320, and 330 are disposed on both one side and the other side of the coupling jig 510, the support substrate 300 and the plurality of magnet structures 310, 320, and 330 may be disposed on any one of the one side and the other side.

The plurality of magnet structures 310, 320, and 330 may be provided between the support substrate 300 and the coupling jig 510, and may include a first magnet structure 610 adjacent to an upper end of the coupling jig 510, a second magnet structure 620 adjacent to a middle end of the coupling jig 510, and a third magnet structure 630 adjacent to a lower end of the coupling jig 510. For example, the first magnet structure 610, the second magnet structure 620, and the third magnet structure 630 may have strong magnetic forces in this order.

When the coupling jig 510 is rotated by the rotation of the motor of the rotation module 500 and the plurality of magnet structures 310, 320, and 330 shown in FIGS. 19 and 20 are provided adjacent to the coupling jig 510, a high attractive force may be applied to the upper end of the coupling jig 510 by the first magnet structure 610 having a relatively strong magnetic force. Accordingly, a force may be applied in a direction perpendicular to the direction of the rotation shaft in which the coupling jig 510 is rotated, and a situation in which the coupling jig 510 is eccentrically rotated may be easily described. In addition, the output torque value may be easily measured in a situation in which the coupling jig 510 is eccentrically rotated.

The plurality of magnet structures 310, 320, and 330 may be permanent magnets or electromagnets.

While the present invention has been described in connection with the embodiments, it is not to be limited thereto but will be defined by the appended claims. In addition, it is to be understood that those skilled in the art can substitute, change or modify the embodiments in various forms without departing from the scope and spirit of the present invention.

INDUSTRIAL APPLICABILITY

The structural battery structure for a wearable robot according to the embodiment of the present application may support a load by constituting a frame of the wearable robot while supplying power to the wearable robot, and the torque measuring method for a rotation module of the wearable robot according to the embodiment of the present application and the torque measuring device therefor may measure a torque for components of the wearable robot.

In addition, the structural battery structure for a wearable robot and the method for manufacturing the same, the torque measuring method for a rotation module of the wearable robot, and the torque measuring device therefor according to the embodiment of the present application may be used in various industrial fields such as automobiles, airplanes, industrial robots, and the like.

The invention claimed is:

1. A structural battery structure comprising:

a first fabric having a positive electrode active material layer;

a second fabric spaced apart from the first fabric and having a negative electrode active material layer;

a third fabric disposed between the first fabric and the second fabric;

a first prepreg spaced apart from the third fabric with the first fabric interposed therebetween; and a second prepreg spaced apart from the third fabric with the second fabric interposed therebetween, wherein a first cured polymer pattern, which completely surrounds a periphery of the positive electrode active material layer of the first fabric, is provided between the first fabric and the third fabric, and a second cured polymer pattern, which completely surrounds a periphery of the negative electrode active material layer of the second fabric, is provided between the second fabric and the third fabric.

2. The structural battery structure of claim 1, further comprising a resin impregnated in the first to third fabrics.

* * * * *